Patented Feb. 27, 1951

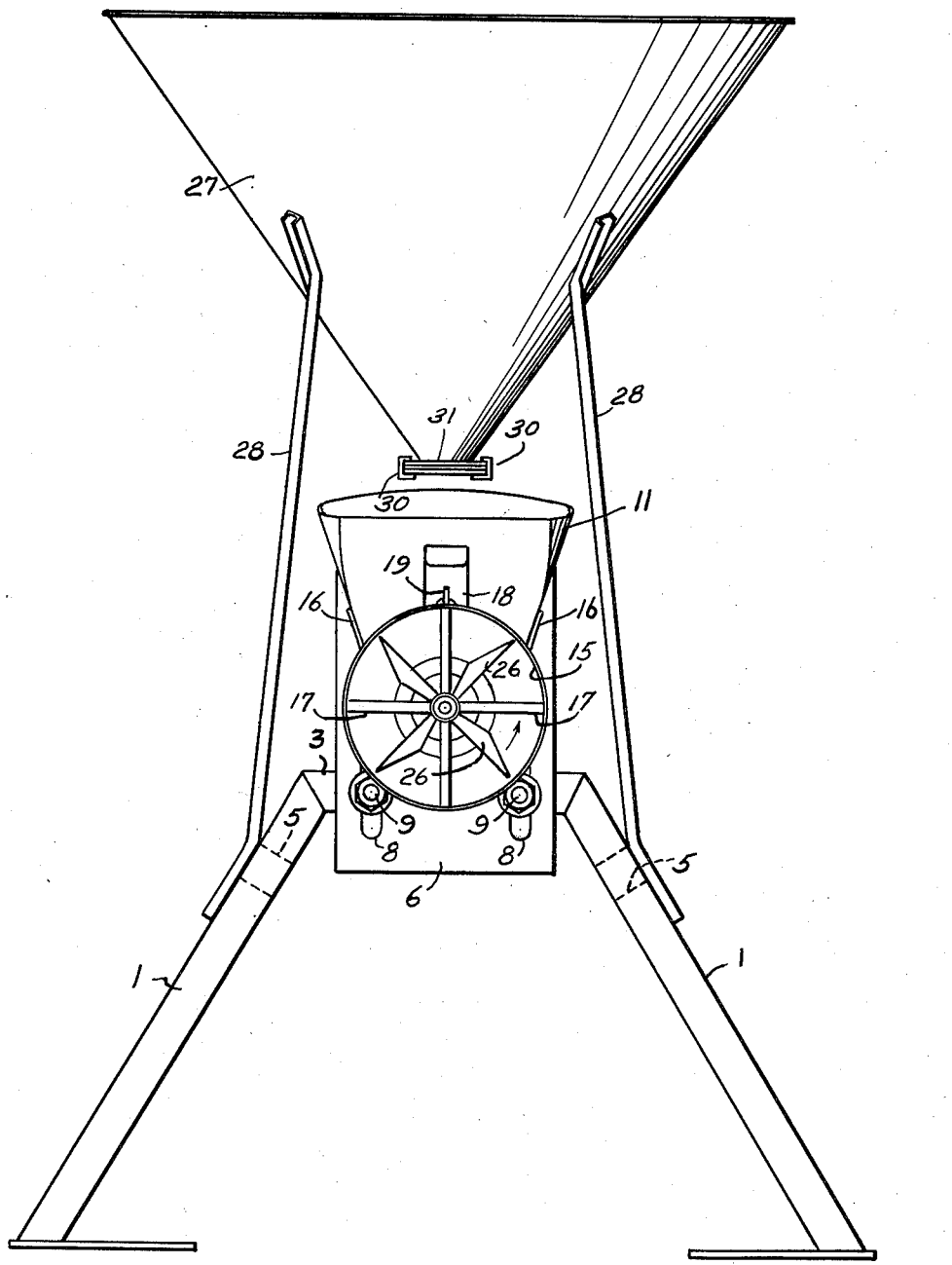

2,543,586

UNITED STATES PATENT OFFICE 2,543,586

BROADCASTING SEEDER

William C. Nabors, Mansfield, La.

Application December 31, 1946, Serial No. 719,583

2 Claims. (Cl. 275—8)

This invention relates to a broadcasting seeder.

An object of the present invention is to provide a machine of the character described especially designed for broadcasting seed.

It is another object of the present invention to provide equipment of the character described which is specially designed to be mounted on a vehicle and which is of such construction that is adaptable for mounting on a tractor or any other selected type of motor vehicle and which may be readily operated from a power takeoff shaft connected with the vehicle motor.

More specifically the invention embodies a supporting frame, a hopper-like seed container fixed above the frame, an adjustable receiving hopper arranged to receive the seed from the container and provided with a hood-like discharge nozzle and impellers in said nozzle and operatively connected with the takeoff shaft for broadcasting the seed received by the nozzle from the seed hopper.

With the above and other objects in view the invention has particular relation to certain novel features of construction, operation and arrangement of parts, an example of which is given in this specification and illustrated in the accompanying drawings wherein—

Figure 2 is a rear elevation thereof.

Figure 1:
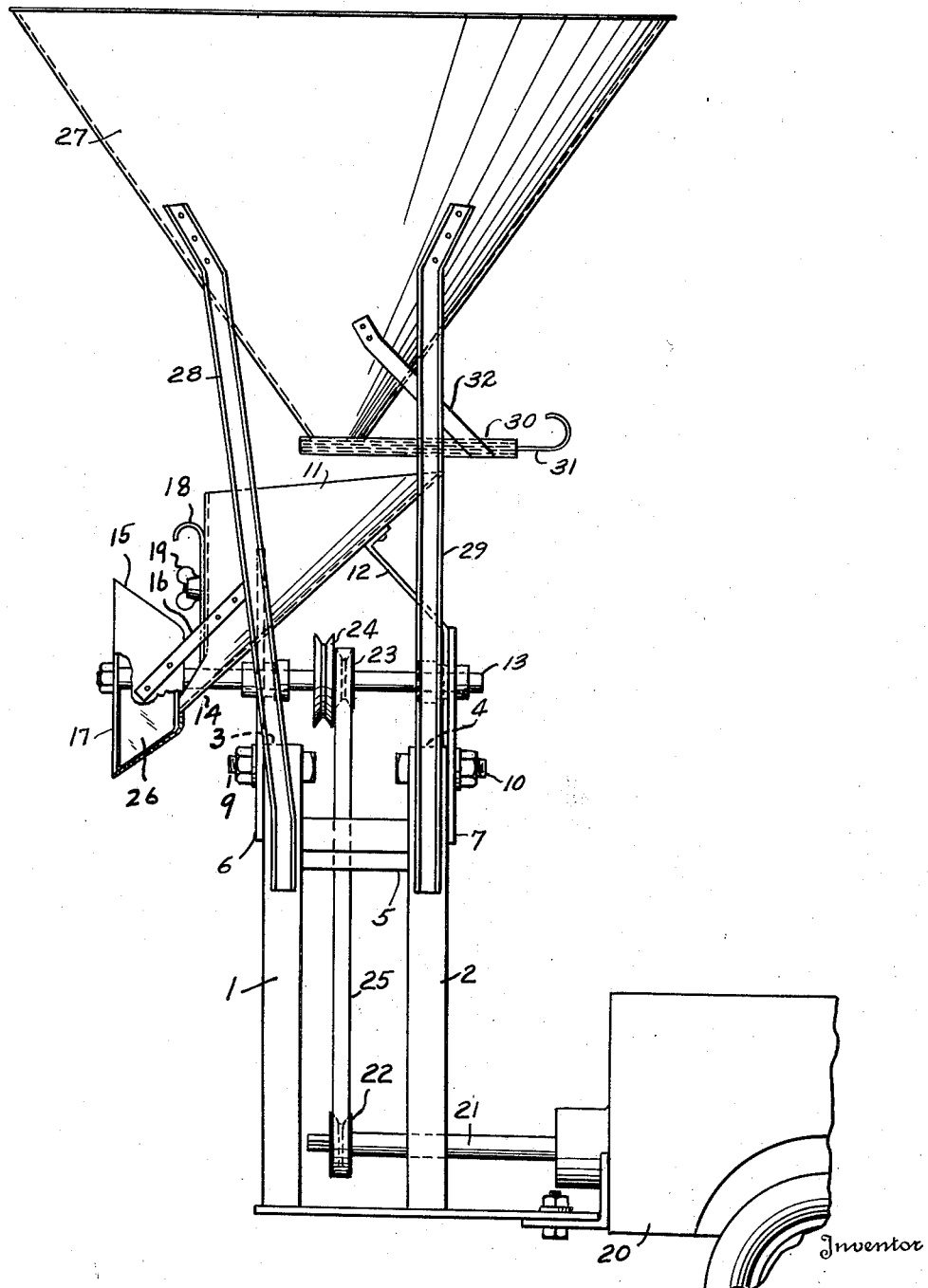
Figure 1 is a side view of the seeder.

Referring now more particularly to the drawings wherein like numerals of reference designate the same parts in each of the figures, the numerals 1, 1 designate upwardly converging rear legs and the numeral 2 designates similar upwardly converging forward legs. The front and rear legs are connected, at their upper ends, by suitable cross bars, as 3 and 4. These front and rear legs are anchored in fixed relation to each other by means of suitable cross bars, as 5, 5. Secured to the rear side of the rear cross bar 3 there is an upstanding plate 6 and secured to the forward side of the cross bar 4 there is an upstanding plate 7. These plates have vertical slots, as 8, 8.

Extended through the respective bars 3 and 4 there are clamp bolts 9, 9 and 10, 10 which extend also through the slots of the plates 6 and 7, and which have heads on their inner ends and clamp nuts on their outer ends whereby the plates 6 and 7 may be clamped in fixed position. By loosening said clamp nuts the plates may be adjusted vertically in an obvious manner.

The plate 6 extends up somewhat further than the plate 7 and its upper end is provided with a U-shaped notch in which the hopper 11 is seated. This hopper may, if desired, be welded to said plate and it is further supported by means of a bracket 12 which is secured thereto at one end and whose other end is suitably secured to the plate 7.

Mounted in suitable bearings in the plates 6 and 7 and extending rearwardly beyond the plate 6 there is an impeller shaft 13.

The lower end of the hopper 11 terminates in a discharge spout 14 through which the shaft 13 extends and fixed to this spout there is a rearwardly flared nozzle 15. This nozzle may be securely anchored in place by suitable side straps 16, 16 which are secured, at their upper ends to the sides of the hopper 11 and at their other ends to the sides of said nozzle.

The free margins of the nozzle may be braced, if desired, by cross braces 17 whose ends are secured to said margins.

The discharge of seed from the hopper 11 through the spout 14 in to the nozzle 15 may be regulated by a suitable vertically slidable gate 18 which may be secured at any desired point of adjustment by a clamp screw 19.

As illustrated the seeder is shown mounted on a motor vehicle 20 which is equipped with a power takeoff shaft 21 driven by the vehicle motor and which has a sheave 22 fixed thereon.

The shaft 13 has a small sheave 23 and a larger sheave 24 fixed thereon.

There is a driving belt 25 which is operable over the sheave 22 and is also operable over the sheave 23 when the unit supporting the hopper 11 is adjusted to its upper position but this belt 25 operates over the sheave 24 when said unit is adjusted to its lower position.

Within the nozzle 15 and fixed on the rear end of the shaft 13 there are the blades 26 which are set at the required angle to propel the seed rearwardly as seed are fed into the nozzle from the hopper 11.

There is a hopper-shaped container 27 for carrying a supply of seed to be broadcast. This container is located above the hopper 11 and is supported on the frame of the seeder by means of rear and front standards 28 and 29 whose lower ends are suitably secured to the legs 1 and 2 and whose upper ends are secured to the container.

The container has an outlet over the hopper 11 and secured to the lower end of the container there are the tracks 30, 30 in which a controlling gate 31 is slidable. The outer end of the tracks may be secured in place by the angle braces, as 32, 32, whose ends are secured to the container and to the tracks, respectively.

The gate 31 may be adjusted to allow the flow of seed from the container 27 into the hopper in the quantity required, or said gate may be completely closed.

As the vehicle 20 moves along the shaft 13 and impellers 26 will be rotated and the seed will be fed from the container 27 into the hopper and thence into the nozzle 15 and the impact of the blades 26 against the seed together with the air current generated by said blades will broadcast the seed uniformly over a definite area and the quantity of seed being delivered may be regulated in accordance with the requirements of the situation.

The drawings and description are illustrative merely while the broad principle of the invention will be defined by the appended claims.

What I claim is:

1. A machine of the character described comprising, a frame, standards fixed to and upstanding from the frame, a hopper-like seed container supported by said standards above the frame, front and rear plates vertically adjustable on the frame, means for securing said plates to the frame at a selected point of adjustment, a hopper beneath the container supported by said plates and adjustable with said plates, a downwardly and forwardly projecting spout on the lower end of the hopper which terminates in a forwardly and outwardly flared nozzle, a transverse shaft mounted in bearings in said plates and extending through said spout and axially into the nozzle, a source of power, rotatable means operatively connecting the shaft to said source for rotating the shaft, impeller blades fixed on the forward end of the shaft within the nozzle and set at angles to broadcast the seed from the nozzle as the blades rotate.

2. A machine of the character described comprising, a frame adapted to be mounted on a motor vehicle, standards fixed and upstanding from the frame, a hopper-like seed container supported by said standards above the frame, front and rear plates vertically adjustable on the frame, means for securing said plates to the frame at a selected point of adjustment, a hopper beneath the container supported by said plates and adjustable with said plates, a downwardly and forwardly projecting spout on the lower end of the hopper which terminates in a forwardly and outwardly flared nozzle, a transverse shaft mounted in bearings in said plates and extending through said spout and axially in the nozzle, impeller blades fixed on the forward end of the shaft within the nozzle and set at angles to broadcast the seed from the nozzle as the blades rotate, said vehicle having a power take-off shaft and operative connections between said shafts operative at either point of adjustment of said plates whereby the impeller shaft may be driven.

WILLIAM C. NABORS.

REFERENCES CITED

The following references are of record in the file of this patent:

UNITED STATES PATENTS

| Number | Name | Date |
| --- | --- | --- |
| 18,083 | Cahoon | Sept. 1, 1857 |
| 1,011,071 | Mehlberger | Dec. 5, 1911 |
| 1,619,795 | Roby | Mar. 1, 1927 |
| 2,281,212 | Stoltzfus | Apr. 28, 1942 |
| 2,327,266 | Hoffstetter | Aug. 17, 1943 |
| 2,334,376 | Bauer | Nov. 16, 1943 |